United States Patent Office 2,821,508
Patented Jan. 28, 1958

2,821,508
CALCIUM MAGNESIUM SILICATE PHOSPHORS

Gilmore E. Crosby, Millersville, and Harold E. McCreary, Lititz, Pa., assignors to Radio Corporation of America, a corporation of Delaware Application April 14, 1955, Serial No. 501,387

8 Claims. (Cl. 252—301.4)

This invention relates generally to improved luminescent materials, also known as phosphors, and particularly, but not necessarily exclusively, to phosphors comprising a host crystal composed of calcium magnesium silicate, to methods for preparing these phosphors and to luminescent screens and cathode ray tubes including these phosphors.

It is an object of this invention to provide improved phosphors of the silicate family and improved methods of preparation thereof.

A further object is to provide improved ultraviolet-emitting phosphors and to provide improved luminescent screens and cathode ray tubes including the improved phosphors of the invention.

Another object is to provide improved ultraviolet-emitting phosphors having increased light output under cathode ray excitation.

Another object is to provide improved methods for preparing calcium magnesium silicate phosphors and to improve the uniformity of such phosphors from batch to batch.

In general, the invention includes phosphors comprising a calcium magnesium silicate host crystal and activator proportions of cerium and an alkali metal incorporated therein. By adding activator proportions of an alkali metal to a cerium-activated calcium magnesium silicate phosphor, the light output is increased, the phosphor is more uniform from batch to batch and the phosphor may be produced in larger batches than previous phosphors without alkali metals.

A method according to the invention comprises reacting an intimate mixture of compounds of calcium, magnesium and silicon and activator proportions of compounds of cerium and an alkali metal, which compounds yield oxides into the reaction product upon heating, in a non-oxidizing atmosphere at a temperature below the melting point of the reaction product.

A luminescent screen according to the invention comprises a substrate having a coating thereon including one of the phosphors of the invention.

A cathode ray tube according to the invention, comprises an envelope, a cathode ray gun within one portion of said envelope, and a luminescent screen of the invention in another portion of said envelope, said luminescent screen being adapted to be excited by cathode rays from said gun.

Figure 1:
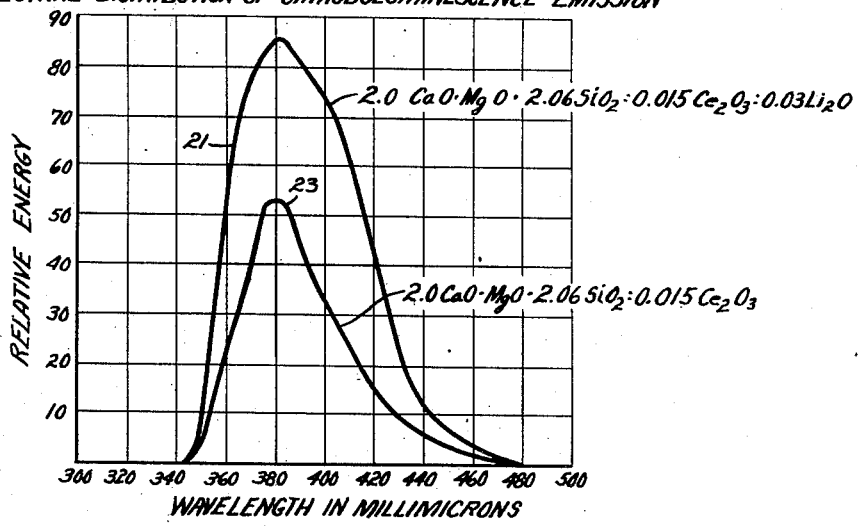
Figure 2:
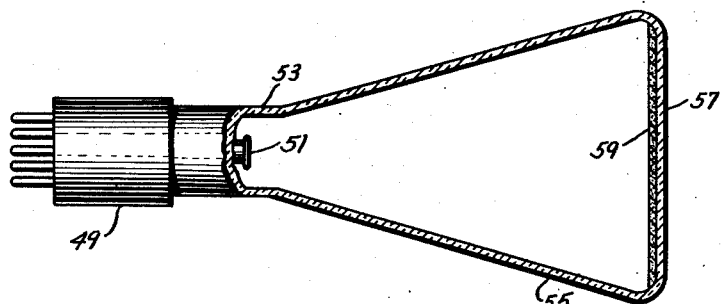

The foregoing objects and other advantages will be more completely described by reference to the accompanying drawing in which:

Figure 1 is a curve illustrating the spectral distribution of the emission of a phosphor of the invention when excited with cathode rays and, Figure 2 is a partially sectional, elevational view of a cathode ray tube having a luminescent screen on the face plate thereof including a phosphor of the invention.

*Example.*—Slurry a mixture of 2002 grams of $CaCO_3$, 843 grams of $MgCO_3$, 1237 grams of $SiO_2$, 130 grams of $Ce(NO_3)_3 \cdot 6H_2O$ and 22.0 grams of $Li_2CO_3$ in distilled water, mill the slurry for about 15 hours to obtain intimate mixing of the ingredients and dry at about 125° C. The dry powder is pulverized, and placed in a silica crucible. Carbon blocks are placed on top of the charge, and the crucible covered. The crucible is fired for about 2½ hours at about 1225° C., cooled and the fired product milled for about 15 hours in carbon tetrachloride to provide a fine particle size. The milled and fired product is then dried and is ready for use.

The composition of the fired product calculated from the composition of the initial mixture is $$2.0CaO \cdot 1.0MgO \cdot 2.06SiO_2 : 0.015Ce_2O_3 : 0.03Li_2O$$

Referring to Figure 1, the spectral distribution of the emission of this phosphor when excited with cathode rays is shown by the curve 21. The spectral distribution of the emission of a similar phosphor prepared without lithium is shown by the curve 23. The ultraviolet light output of the phosphor of the example under cathode ray excitation is at least 50% greater than a corresponding composition prepared without lithium.

The compositions of the invention have been described with respect to the single composition of the example. However, the invention includes a wide range of compositions expressed generally as calcium magnesium silicate having activator proportions of cerium and an alkali metal incorporated therein. The preferred compositions are expressed by the following molecular formula:

$$aCaO \cdot 1.0MgO \cdot bSiO_2 : cCe_2O_3 : dM_2O$$

wherein:

M is any alkali metal, such as lithium, sodium and potassium $a$ is between 1 and 3

$b$ is between 2 and 2.30

$c$ is between 0.0025 and 0.05

$d$ is between 0.005 and 0.10

The preferred proportion of calcium oxide to magnesium oxide is 2:1. Decreasing the proportion of calcium oxide to magnesium oxide to 1:1 reduces the ultra-violet light output of the phosphor by about 25% and increases the percent light output after $10^{-6}$ seconds decay by about 25%. Increasing the proportion of calcium oxide to magnesium oxide to 3:1 reduces the ultraviolet light output of the phosphor by about 40% and increases the ultraviolet light output after $10^{-6}$ seconds decay by about 25%.

By varying the proportion of $SiO_2$, $Ce_2O_3$ and alkali metal oxide from the preferred composition set forth in Example 1, the ultraviolet light output is decreased to some extent and the decay increased to some extent. Thus, according to the invention a range of ultraviolet light outputs and decay characteristics may be obtained. In the family of compositions $$2CaO \cdot MgO \cdot 2.06SiO_2 : 0.015Ce_2O_3 : dLi_2O$$

the molar proportion, $d$, of $Li_2O$ may be varied between 0.02 and 0.08 without a substantial change in ultraviolet light output.

Incorporating activator proportions of an alkali metal oxide into cerium activated calcium magnesium silicate phosphors increases the ultraviolet light output of corresponding compositions of phosphors without alkali metal oxides. Furthermore, corresponding compositions prepared without activator proportions of alkali metal oxides are difficult to prepare and usually require firing to be carried out in a hydrogen or hydrogen and steam atmosphere and therefore must be made in small batches which batches are frequently non-uniform. The compositions of the invention may be prepared in large batches, making synthesis considerably simpler, easier, cheaper and more uniform from batch to batch.

The ingredients for preparing the phosphors of the invention are discussed as oxides and may be introduced into the raw batch as raw oxides. However, they may also be introduced as compounds of calcium, magnesium, silicon, cerium or an alkali metal which yield oxides of these metals into the reaction product upon heating. Thus, for example, one may use carbonates, nitrates or acetates of these metals. The raw materials are preferably non-volatile at elevated temperatures and are of the highest purity.

The process of the invention may be varied from that set forth in Example 1. Firing may be carried out above 1150° C. and below the melting point of the reaction product. The firing is carried on until the reaction is complete, which is of the order of 1 to 20 hours. The firing time depends upon the size of the batch being fired and the temperature at which the firing is carried on. A non-oxidizing atmosphere is used. A preferred method for obtaining a non-oxidizing atmosphere is to load a crucible with an intimate mixture of the raw materials, place carbon blocks on top of the mixture and then cover the crucible as described in the example. It is believed that, during the firing, carbon monoxide is formed providing a reducing atmosphere at the mouth of the crucible. Other atmospheres may be used, for example, hydrogen, nitrogen, argon and mixtures of steam and hydrogen. Similarly, the phosphors of the invention may be prepared by firing the mixture of ingredients in an open boat in one of the above-mentioned atmospheres in the manner described.

Referring to Figure 2, cathode ray tubes according to the invention may include a luminescent screen comprising a phosphor of the invention. The cathode ray tube may comprise a tube base 49 including a cathode ray gun 51 and a glass envelope comprising a neck portion 53, a conical portion 55 and a face plate 57. A thin layer 59 of a composition including a phosphor of the invention is disposed on the inner surface of the face plate 57. The thin layer 59 on the face plate 57 is referred to as the luminescent screen. The thin layer 59 may comprise a uniform composition throughout or may comprise a plurality of areas.

The cathode ray tubes of the invention are particularly useful in flying-spot scanners for television purposes. It is desirable that such tubes have a high output of ultra-violet light and a rapid decay of luminescence.

There have been described improved calcium magnesium silicate phosphors, methods for preparing such improved phosphors and improved luminescent screens and cathode ray tubes including such phosphors.

What is claimed is:

1. A phosphor having the molar composition $$a\text{CaO} \cdot 1.0\text{MgO} \cdot b\text{SiO}_2 : c\text{Ce}_2\text{O}_3 : d\text{M}_2\text{O}$$

wherein: M is an alkali metal, $a$ is between about 1 and 3, $b$ is between about 2.0 and 2.30, $c$ is between about 0.0025 and 0.05 and $d$ is between about 0.005 and 0.10.

2. A phosphor having the molar composition $$2.0\text{CaO} \cdot 1.0\text{MgO} \cdot 2.06\text{SiO}_2 : 0.015\text{Ce}_2\text{O}_3 : x\text{Li}_2\text{O}$$

wherein $x$ is between about 0.02 and 0.08.

3. A phosphor having the molar composition $$2.0\text{CaO} \cdot 1.0\text{MgO} \cdot 2.06\text{SiO}_2 : 0.015\text{Ce}_2\text{O}_3 : 0.03\text{Li}_2\text{O}$$

4. A phosphor having the molar composition $$2.0\text{CaO} \cdot 1.0\text{MgO} \cdot 2.0\text{SiO}_2 : 0.022\text{Ce}_2\text{O}_3 : 0.044\text{Li}_2\text{O}$$

5. A method for preparing a phosphor comprising heating an intimate mixture of compounds which upon thermal decomposition yields between about 1 and 3 moles of CaO, about 1 mole of MgO, between about 2 and 2.30 moles of $SiO_2$, between about 0.0025 and 0.05 mole of $Ce_2O_3$ and between about 0.005 and 0.10 mole of an alkali metal oxide and firing said decomposition products in a non-oxidizing atmosphere at a temperature below the melting point of the reaction product.

6. A method for preparing a phosphor comprising heating an intimate mixture consisting essentially of about 2.0 moles of CaO, as $CaCO_3$, 1.0 moles of MgO, as $MgCO_3$, about 2.06 moles of $SiO_2$, about 0.03 mole of cerium, as $Ce(MO_3)_3 \cdot 6H_2O$, and about 0.03 mole of lithium, as $Li_2CO_3$, in a non-oxidizing atmosphere at about 1225° C. for about 2½ hours.

7. A luminescent screen comprising a substrate coated with a phosphor having the molar composition $$a\text{CaO} \cdot 1.0\text{MgO} \cdot b\text{SiO}_2 : c\text{Ce}_2\text{O}_3 : d\text{M}_2\text{O}$$

wherein: M is an alkali metal, $a$ is between about 1.0 and 3.0, $b$ is between about 2.0 and 2.30, $c$ is between about 0.0025 and 0.05, and $d$ is between about 0.005 and 0.10.

8. A luminescent screen comprising a substrate coated with a phosphor having the molar composition $$2.0\text{CaO} \cdot 1.0\text{MgO} 2.06\text{SiO}_2 : 0.015\text{Ce}_2\text{O}_3 : x\text{Li}_2\text{O}$$

wherein: $x$ is between about 0.02 and 0.08.

References Cited in the file of this patent

UNITED STATES PATENTS

| | | |
|---|---|---|
| 1,603,284 | Johnson | Oct. 19, 1926 |
| 2,575,755 | Froelich | Nov. 20, 1951 |
| 2,577,161 | Smith | Dec. 4, 1951 |